United States Patent [19]
Lin et al.

[11] Patent Number: 5,214,506
[45] Date of Patent: May 25, 1993

[54] LOW BIT-RATE VIDEO CODING TECHNIQUE

[75] Inventors: David W. Lin, Hsinchu, Taiwan; Ngan King N., Clayton, Australia

[73] Assignee: Bell Communications Research, Inc., Livingston, N.J.

[21] Appl. No.: 752,868

[22] Filed: Aug. 30, 1991

[51] Int. Cl.⁵ .............................................. H04N 7/13
[52] U.S. Cl. .................................... 358/183; 358/136
[58] Field of Search ........................ 358/133, 135, 136

[56] References Cited

U.S. PATENT DOCUMENTS 5,136,371  8/1992  Savatier et al. ................ 358/136 X

OTHER PUBLICATIONS

"Buffering of Data Generated by the Coding of Moving Images", J. O. Limb, *AT&T—The Bell System Technical Journal*, vol. 51, No. 1, Jan. 1972, pp. 239-259.
"Revised Recommendation H.261—Video Code for Audiovisual Services at p×64 kbits/s", DOC.COM XV-R-17E, Jan. 1990, pp. 55-80.
"Video Codec for Audiovisual Services at p×64 kbits/s", *International Telegraph and Telephone Consultative Committee* (CCITT) COM XV-37-E, Aug., 1990.
"Advances in Picture Coding", H. G. Musmann, et al., *Proceedings of the IEEE*, vol. 73, No. 4, Apr. 1985, pp. 523-548.
"Description of Ref. Model 8 (RMB)", *Working Party Specialists Group on coding for Visual Telephony*, Jun. 9, 1989, CCITT SGXV.

*Primary Examiner*—Victor R. Kostak
*Attorney, Agent, or Firm*—Leonard Charles Suchyta; Stephen M. Gurey

[57] ABSTRACT

In a low bit-rate video coder which processes the pels in each video frame on a block-by-block basis using a hybrid differential pulse code modulation and discrete cosine transformation as defined in CCITT Recommendation H.261, the blocks are processed in a sequential order, which in areas of high activity may cause the output buffer to approach its capacity level. In response, the adjoining blocks are more coarsely quantized with resultant image degradation. Improved coding performance is achieved by processing the blocks in a pseudo-random order which disperses the high activity blocks among the more quiescent blocks. As a result the buffer is less likely to reach its maximum capacity, and the quantization levels will remain essentially constant throughout coding of the frame, thereby improving image quality.

8 Claims, 3 Drawing Sheets

LOW BIT-RATE VIDEO CODING TECHNIQUE

BACKGROUND OF THE INVENTION

This invention relates to coding of video signals, and more particularly to improving the coding performance of low bit-rate video coders which process the pels in each video frame on a block-by-block basis.

The CCITT (International Telegraph and Telephone Consultative Committee) in the past few years has been in the process of drafting its Recommendation H.261 which defines a method for video signal coding at $p \times 64$ kb/s where $p=1,2, \ldots 30$ (see e.g., Working Party XV/1, CCITT, "Draft revised Recommendation H.261—video codec for audiovisual services at $p \times 64$ kbits/s," DOC. COM XV-R 17-E, Jan. 1990; and "Video Codec for Audiovisual Services at $p \times 64$ kbits/s," CCITT Recommendation H.261, CDM XV-R 37-E, International Telegraph and Telephone Consultative Committee (CCITT), August 1990). H.261 is now a standard, having been formally approved in December, 1990. At the low rate end ($p=1$, or 2), a major application envisioned is videophone service over the Integrated Services Digital Network (ISDN). The H.261 video coder uses a hybrid coding approach (H. G. Musmann, P. Pirsch, and H-J. Grallert, "Advances in picture coding," *Proc. IEEE*, vol 73, no. 4, pp. 523-548, Apr. 1985) where interframe redundance is exploited by motion-compensated differential pulse code modulation (DPCM) and the resulting signal is coded in the discrete cosine transform (DCT) domain.

Two spatial resolutions have been adopted for H.261: CIF (common intermediate format), having 288 lines $\times$ 352 pels per line, and QCIF (quarter CIF), having 144 lines $\times$ 176 pels per line. These resolutions apply to the luminance component of a color image. In each case, resolution of the two chrominance components is $\frac{1}{4}$ of that of the luminance, being half in both the horizontal and vertical directions. Each video frame is divided into "macro blocks" for coding where each macro block contains $16 \times 16$ pels, or more precisely, $16 \times 16$ luminance pels and two times $8 \times 8$ chrominance pels. For each macro block, motion estimation is first performed and then the predicted result is divided into six $8 \times 8$ blocks (4 for the luminance component and one each for the two chrominance components) for DCT and subsequent quantization and coding. For data compression efficiency, variable-wordlength codes are used extensively in the video multiplex coder. This necessitates the use of a buffer to hold the coded quantities before transmitting them through a fixed-rate channel. For framing and other purposes, macro blocks in a video frame are grouped into group-of blocks (GOBs) with each GOB consisting of 33 macro blocks (3 rows of 11 macro blocks). The GOBs are transmitted in sequence and within each GOB, the coded macro blocks are transmitted one by one in natural order (i.e., row by row and, within each row, block by block from left to right).

During the development of the H.261, a series of reference coding algorithms called "reference models" were established. A recent model is called Reference Model 8, or RM8 and is described in "Description of reference model 8 (RM8)," Document 525, CCITT Study Group XV, Working Party XV/4, Specialists Group on Coding for Visual Telephony, Jun. 9, 1989. In the RM8 coding algorithm a two-dimensional variable length code (2-D VLC) is used, in which the runlength of the number of zero coefficients preceding a non-zero quantized coefficient and the magnitude of the non-zero coefficient are coded. Quantization of the coefficients is by means of a quasi-uniform quantizer with adjustable step-size controlled by the buffer level. A variable threshold is applied to the coefficients to increase the number of zero coefficients. Although the RM8 coding algorithm performs reasonably well over a wide range of bit rates, image degradation is visible at low bit rates such as 64 or 128 kb/s. This degradation arises because the low bit rates force the quantization to be coarse.

A typical videophone scene consists of a portrait of the conversing party with some foreground and background. As the person in the scene moves, parts of the background are covered and uncovered. The moving portion of the scene often spans a region extending across several macro blocks both horizontally and vertically. The aforenoted RM8 reference coding algorithm specifies that the quantizer step-size be adapted according to the buffer level once per row of macro blocks in a GOB. Two effects of this adaption process have been observed. Firstly, in the still segments of a scene the buffer level is likely to drop to zero, thereby not fully utilizing the available channel capacity. Secondly, and more importantly, in a contiguous set of block rows which contain moving objects, there may exist one or more rows for which the buffer level at the end of the row is significantly higher than at the beginning. Thus the respective next rows are quantized more coarsely than their preceding spatial neighbors. As a result, different parts of the same object which spans several block rows may get coded with significantly different quantization levels causing noticeable image degradation. Although adapting the quantizer step-size once per macro block rather that once per block row will somewhat ease the problem, significant degradation is still likely to be observed on the right side of the image in "busy" moving areas.

An object of the present invention is to improve the coding performance of a low bit-rate coder that performs block processing of the pels of a video signal.

SUMMARY OF THE INVENTION

In accordance with the present invention improved low bit-rate coding performance is achieved by processing the blocks in each video frame in a pseudo-random order instead of in the sequential order defined in the aforenoted reference coding algorithm. By randomizing the order in which the macro blocks are processed, the macro blocks containing moving objects get randomly interspersed among those containing still objects. Since the regions of contiguous activity are broken up, the buffer level has a higher probability of remaining at an even level throughout the processing of each frame. As a result, high activity regions will more likely be quantized with the smaller step sizes corresponding to the lower buffer level and there will not be any dramatic changes in the coarseness of the quantization within the frame that would otherwise result in a noticeable image degradation.

The coder of the present invention includes an input frame memory for storing all the pels of the video frame and a pseudo-random number generator for accessing the macro blocks of the stored frame for processing in the pseudo-random order by the hybrid DPCM/DCT source coder. If the decoder is not required to be compatible with the reference coding algorithm, then the coded macro blocks are transmitted in the pseudo-random order in which they are processed. Once the decoder knows the pseudo-random sequence, it simply decodes each block as it is received and stores the decoded pel values at their appropriate position within a frame memory until the pel values for the entire frame have all been received. If decoder-compatibility is required, the coded macro blocks must be transmitted in the sequential order defined in the draft standard. An additional storage device is thus required within the coder for storing the pseudo-randomly ordered hybrid DPCM/DCT coded macro blocks, which are then resequenced for output in the standard order.

DETAILED DESCRIPTION

Figure 1:
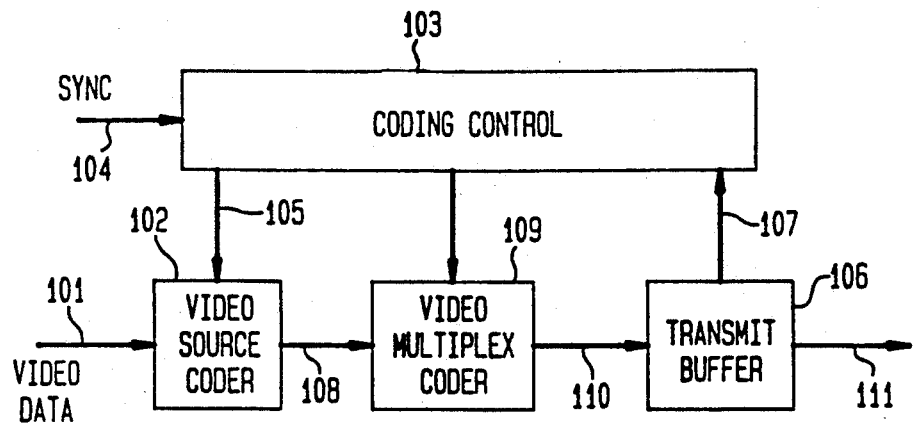
FIG. 1 is a block diagram of the prior art CCITT H.261 encoder structure.

With reference to FIG. 1, a block diagram of the H.261 prior art encoder structure is shown. The functions of this encoder structure are described in detail in the aforenoted CCITT recommendations. In particular, the video data on input data lead 101 is input in block format to video source coder 102. Video source coder 102 is controlled by coding control 103, which may be implemented as a logic circuit, as firm ware in a programmable digital signal processor, or as a microprocessor. Coding control 103, in response to external synchronization information on lead 104, controls the sequence of steps required in accordance with the H.261 defined algorithm. Accordingly, coding control 103 controls the flow of information into and out of the coder components and signals each coder component when and how to execute the proper mode of operation. In addition, coding control 103, by controlling the coder components, ensures proper sequencing of the various outputs.

Video source coder 102, to be described, is a hybrid of DCT and DPCM with motion compensation. As previously noted, source coder 102 processes macro blocks of 16×16 pels. Although motion estimation is performed on this macro block basis, the discrete cosine transform is performed on blocks of 8×8 differential pel values. Lead 105 shown connecting coding control 103 and video source coder 102 represents the plural timing and other required control signals to the source coder 102. One particular control signal is the step-size control of the quantizer within source coder 102, which is determined by the level of transmit buffer 106, which control is input to coding control 103 over lead 107. The output of video source coder 102 consists of the quantized transform coefficients for each 8×8 block, as well as additional side information such as motion estimation vectors for each macro block and quantizer step size for each row of macro blocks. The single output lead 108 of video source coder is actually representative of plural outputs which are input to a video multiplexer coder 109 (controlled by coding control 103), which codes the quantized transformed coefficients into variable length codewords and multiplexes the other variable wordlength codewords for the side information generated by source coder 102 into a single bit stream on lead 110. Transmit buffer 106 accepts this multiplexed bit stream at a nonuniform bit rate and outputs a constant bit rate stream onto transmission channel 111.

Figure 2:
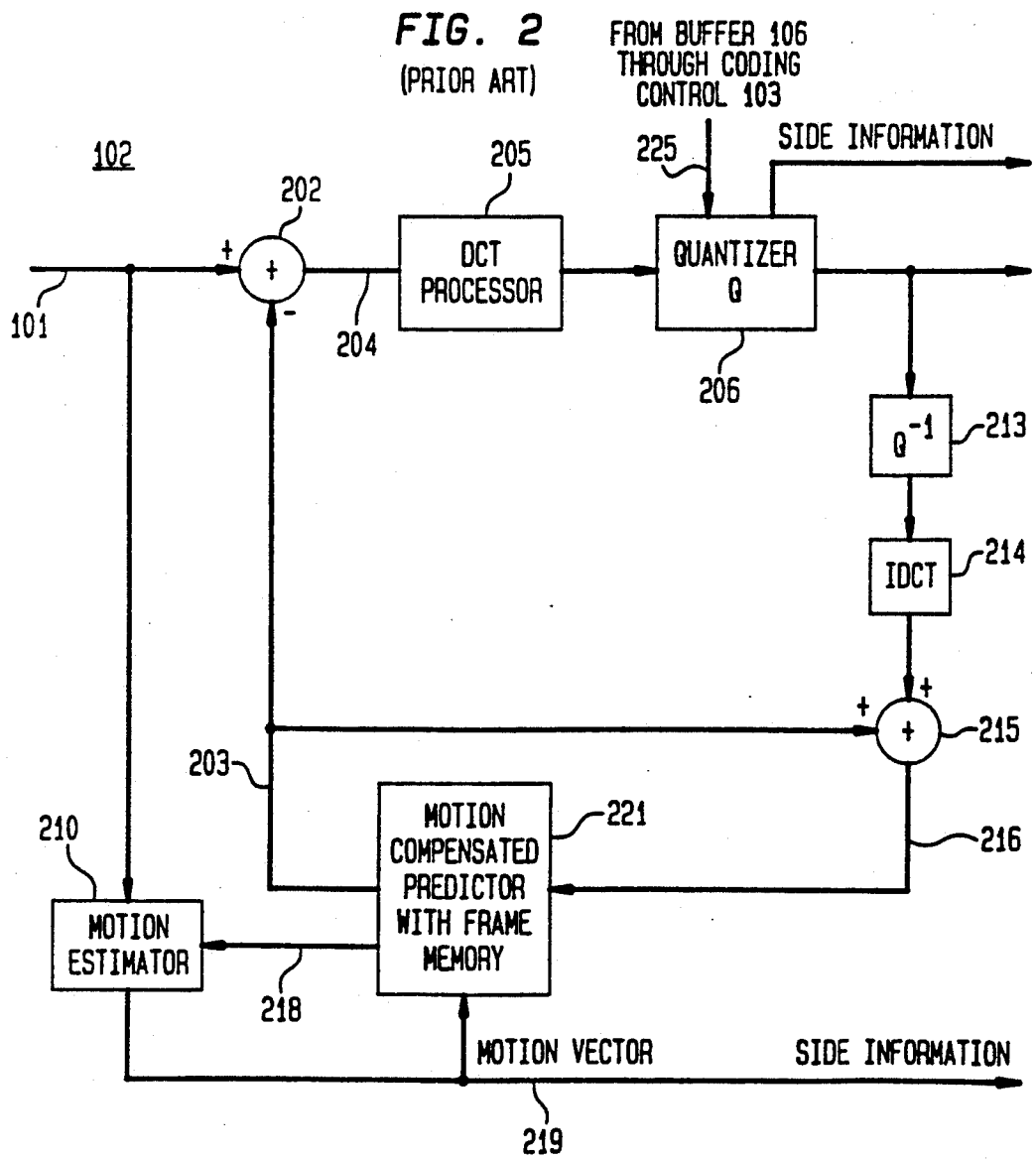
FIG. 2 is a block diagram of the prior art CCITT H.261 source coder structure.

FIG. 2 shows a block diagram of the structure of the prior art H.261 source coder 102. The input pels of the current frame are input over video data input lead 101 (same numerical designation as in FIG. 1) in 8×8 block format to a signal combiner 202. Signal combiner 202 subtracts predicted pel values on lead(s) 203 from the pels of the current frame provided on input lead 101. The predicted pel values on lead(s) 203 are those pels from the previous video frame as displaced by the estimate of the horizontal and vertical translation of what has been determined to best correspond with that input block of pels in the previous frame. As will be described, each of the predicted pel values on lead(s) 203 are output by a motion compensated predictor 221, which incorporates a frame memory, and which is controlled by motion estimator 210. The resultant differential pels on lead(s) 204 are processed by discrete cosine transform processor 205. The transform coefficients of each block at the output of DCT processor 205 are then quantized by quantizer 206. The step-size of quantizer 206 is controlled via lead 225 in accordance with the level of transmit buffer 106 via the coding control 103 (shown in FIG. 1). These quantized transform coefficients are output to video multiplex coder 109 (in FIG. 1) for variable word length coding. As these quantized transformed coefficients are being coded, these same quantized coefficients are converted by inverse quantizer 213 and inverse DCT (IDCT) 214 back into coded differential pel values. The coded differential pel values at the output of IDCT 214 are added by signal combiner 215 to the motion compensated values on output 203 of motion compensated predictor 221 to reconstruct, on lead(s) 216, the actual coded pel values. These coded pel values on lead(s) 216 are input to predictor 221 for storage in the frame memory for subsequent processing of the next frame.

The inputs to motion estimator 210 are the pel values of the current frame in macro block 16×16 format (luminance values only), and the pel values of the previous coded frame stored in the frame memory of predictor 221 and input to estimator 210 in macro block format over lead(s) 218. Using a prescribed motion estimating algorithm, motion estimator 210 compares each nonoverlapping macro block of input pels from input 101 and compares these input pel values with the pel values in a larger search window of coded pel values from the previous frame which are stored in the frame memory of predictor 221. This larger search window is centered at the same location as the input macro block on the previous coded frame. Comparisons are made between the pel values in the input macro block of the current frame and the coded pel values from the previous frame as the input macro block is swept through the search window. The horizontal and vertical displacements from the nominal "no motion" central position within the search window that yields the best match between the macro block from the current frame and the coded pel values from the previous frame determines the components of the estimated motion vector for that input macro block. This motion vector is output on lead 219 to predictor 221. For each pel with the macro block having the same motion vector, predictor 221 uses that vector to determine the addresses within its frame memory to obtain the predicted pel values to be output on lead 203 to signal combiner 202. As previously noted, block matching is done on a macro block basis. Therefore the same vector is used for each of the pels within each of the four 8×8 luminance blocks as well as the two 8×8 chrominance blocks within the same macro block. The same predicted pel values on lead 203 are also added by signal combiner 215 to the inverse quantized and inverse DCT processed values at the output of inverse DCT processor 214 to produce the actual coded pel values on lead 216 that are stored in the frame memory of predictor 221 for processing of the next frame. The motion vector on lead 219 associated with each macro block is input to the video multiplex coder 109 (in FIG. 1) for multiplexing with the variable wordlength coded quantized coefficients and the quantizer step-size for each row of macro blocks.

The present invention, rather than processing each macro block in a sequential order left to right, top to bottom, processes the macro blocks in a pseudo-random order so that the macro blocks containing moving objects get randomly interspersed among those containing still objects. For QCIF video containing 144 lines×176 pels per line, there are 9 rows of 11 macro blocks containing 16×16 pels, or 99 macro blocks per video frame. Accordingly, a pseudo-random sequence of the numbers 1 through 99 is used to determine the processing order of the macro blocks within each video frame. In particular, the pseudo-random sequence is obtained by excerpting from the state sequence of a 7-bit maximal-length feedback shift register (see e.g., E. A. Lee and D. G. Messerschmitt, *Digital Communications*, Boston, Mass.: Kluwer Academic, 1988). For ease of reference, S[i] denotes the ith element of a particular pseudo-random sequence. As second layer of randomization is also employed to randomize the position of the first macro block processed in each video frame using the same particular pseudo-random sequence. In other words, for the ith video frame being coded, the first macro block processed is macro block number k=S[(i−1)modulo99+1]. The jth macro block processed is macro block number (k+S[j]−2)modulo99+1. An example of a pseudo-random macro block sequence that has been experimentally employed for QCIF video is shown in TABLE 1 below.

TABLE 1

| 1, | 2, | 4, | 8, | 17, | 34, | 68, | 9, | 19, | 38, | 76, |
|---|---|---|---|---|---|---|---|---|---|---|
| 24, | 49, | 98, | 69, | 11, | 23, | 46, | 93, | 58, | 86, | 45, |
| 91, | 54, | 88, | 48, | 96, | 65, | 3, | 6, | 12, | 25, | 51, |
| 77, | 26, | 53, | 84, | 41, | 83, | 39, | 78, | 28, | 57, | 79, |
| 30, | 61, | 90, | 52, | 80, | 33, | 66, | 5, | 10, | 21, | 42, |
| 85, | 43, | 87, | 47, | 95, | 62, | 82, | 37, | 74, | 20, | 40, |
| 81, | 35, | 70, | 13, | 27, | 55, | 92, | 56, | 99, | 71, | 15, |
| 31, | 63, | 97, | 67, | 7, | 14, | 29, | 59, | 94, | 60, | 75, |
| 22, | 44, | 89, | 50, | 73, | 18, | 36, | 72, | 16, | 32, | 64; | where the numbers give the natural ordinal position of the macro blocks in a video frame. For example, macro block number 64 is the ninth macro block in the sixth block row of the video frame.

Figure 3:
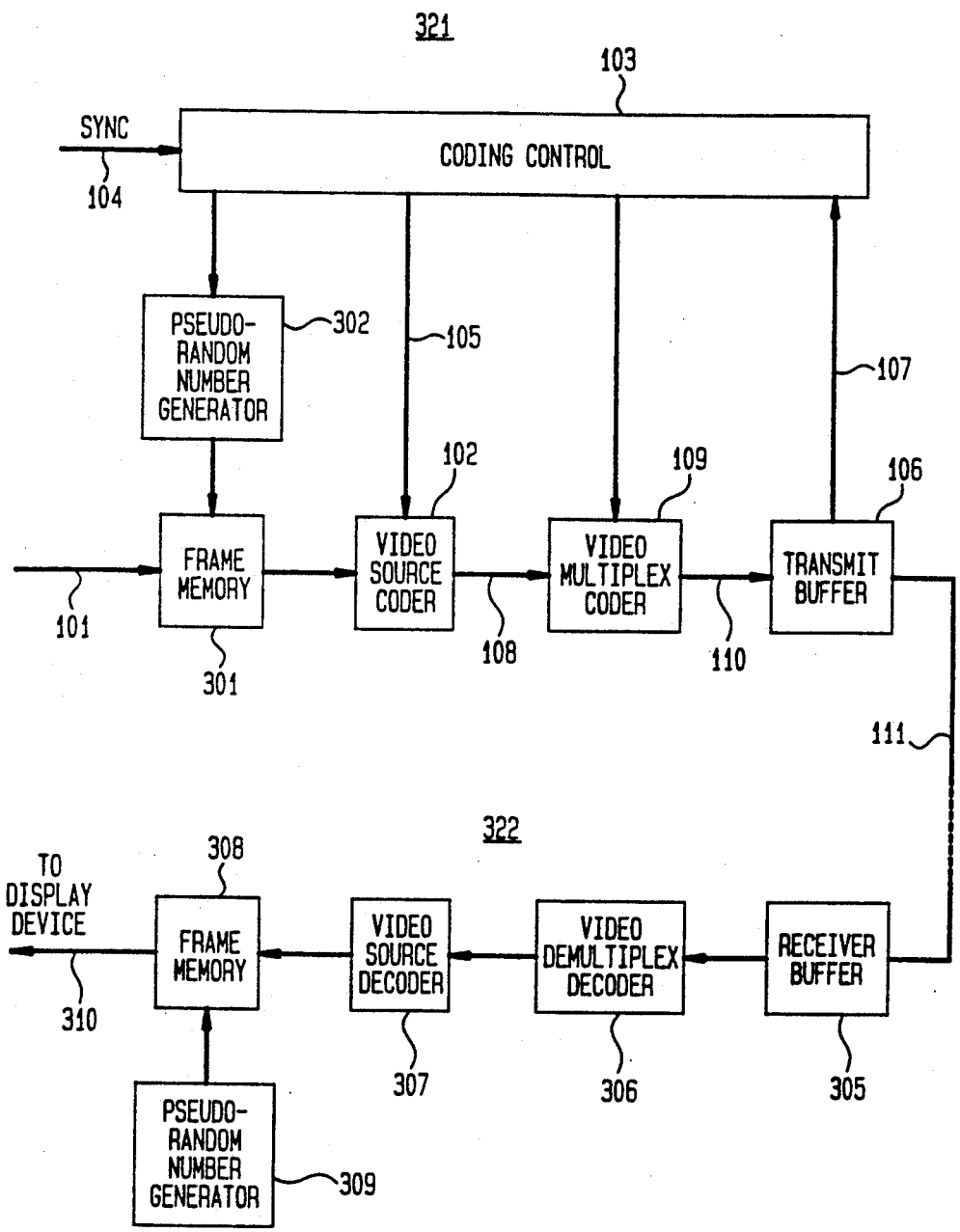
FIG. 3 is a block diagram of the encoder and decoder in accordance with one embodiment of the present invention in which decoder compatibility to the H.261 standard is not required.

If the decoder does not have to be compatible with a standard decoder, then the coded macro blocks can be transmitted in the pseudo-random order they are processed, assuming that the decoder "knows" the pseudo-random sequence used by the encoder. FIG. 3 shows the block diagram of the encoder 321 and decoder 322 of the present invention using randomization of the processing order of the macro blocks. Similar numerical designations have been given to those components common to the encoder in FIG. 1. Unlike the prior art encoder in FIG. 1 in which each block of data on input 101 is processed as it arrives, randomization requires acquisition of a whole video frame before any of its macro blocks can be coded. Therefore, the video data on input lead 101 of encoder 321 is input to a frame memory 301 which stores the macro blocks for the whole frame before processing begins. Once all the macro blocks are input to frame memory 301, the macro blocks are sequentially read out of memory 301 in the order determined by the pseudo-random sequence produced by pseudo-random number generator 302 consisting of a maximal-length feedback shift register or a look-up table (not shown). The sequencing of random number generator is controlled by coding control 103 as it produces an order of macro block numbers that is a function of the video frame being coded and the macro block number being processed.

Each macro block is processed by video source coder 102, multiplexed and coded by video multiplex coder 109, and transmitted onto channel 111 through transmit buffer 106. At the decoder 322 a receiver buffer 305 stores the bit stream received on channel 111, a video demultiplex decoder 306 demultiplexes and decodes the variable wordlength codewords and the transmitted side information, and a video source decoder 307 reconstructs the pel values of the transmitted macro blocks. Each macro block is stored in a frame memory 308 addressed in spatial position as determined by pseudo-random number generator 309. Pseudo-random number generator 309 starts with the same state sequence as pseudo-random number generator 302 at the encoder. The sequence of numbers produced by pseudo-random number generator 309 is therefore identical to the sequence produced by pseudo-random number generator 302 so that each received macro block in each video frame is appropriately addressed to the correct spatial position. Once all the macro blocks for the entire frame are entered into frame memory 308, the video frame is converted to analog format (not shown) for input over lead 310 to a video display device.

Figure 4:
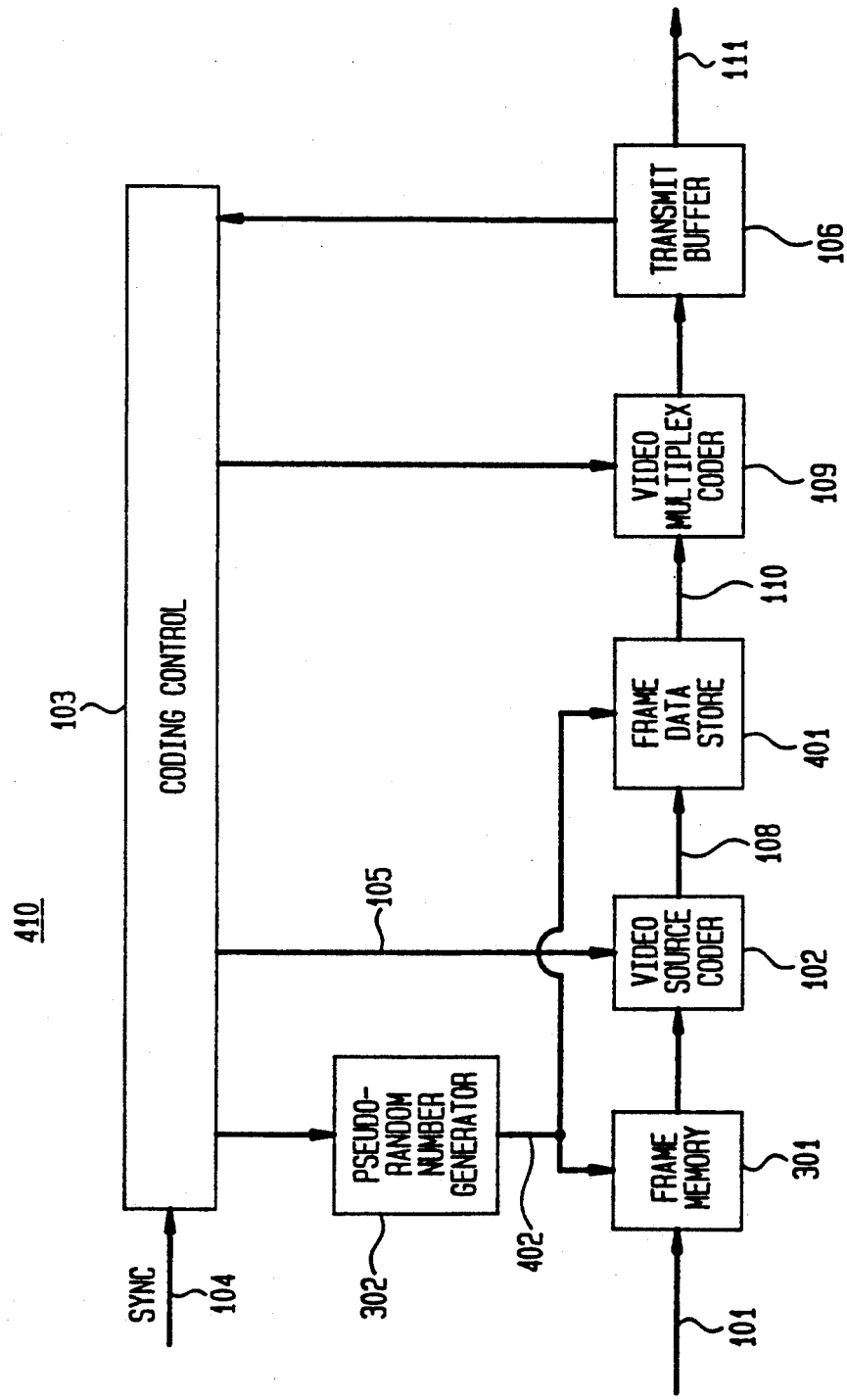
FIG. 4 is a block diagram of the encoder structure in accordance with a second embodiment of the present invention in which compatibility to the H.261 standard is required.

To make the algorithm compatible with the decoder defined by the proposed CCITT standard, the coded macro blocks need to be transmitted in the sequential order defined by the draft standard rather than be transmitted in the pseudo-random order in which they are processed. This requires storage of all the coded macro blocks, pseudo-randomly ordered, of a video frame in the encoder for resequencing for standard compliance. FIG. 4 shows the block diagram of an encoder 410 which is compatible with a standard decoder. Similar numerical designations are given to those elements common to FIGS. 1, 3 and 4. The encoder 410 in FIG. 4 is similar to encoder 321 in FIG. 3, but includes an additional frame data storage device 401 for storing the macro blocks processed by video source coder 102. As each macro block is processed by video source coder 102, it is stored in storage device 401 in a location determined by the output of pseudo-random number generator 302 on lead 402, which is connected to the control input of device 401. Once all the macro blocks are processed by video source coder 102 and frame data storage device 401 is full, the stored processed macro blocks are read out in the standard sequential order for variable wordlength coding and multiplexing by video multiplex coder 109.

Although described in connection with the CCITT H.261 video encoder which uses a hybrid DCT/DPCM video source coder, the principles of the present invention could equally be applied to any video signal encoder which processes the video signal in a block-by-block basis.

The above-described embodiments are illustrative of the principles of the present invention. Other embodiments could be devised by those skilled in the art without departing from the spirit and scope of the present invention.

What is claimed is:

1. A method of coding blocks of pels of a video frame for transmission comprising the steps of:
    storing all of the pels in each of the blocks of the video frame;
    outputting the stored blocks of pels for the frame in a pseudo-random order;
    processing and coding each block of pels in that pseudo-random order; and
    transmitting the processed and coded blocks of pels for the frame in that same pseudo-random order.

2. A method of encoding and decoding blocks of pels of a video frame comprising the steps of:
    storing all of the pels in each of the blocks of the video frame;
    outputting the stored blocks of pels for the frame in a pseudo-random order;
    processing and coding each block of pels in that pseudo-random order for transmission;
    decoding and inverse processing each block of processed and coded pels received sequentially in said pseudo-random order; and
    storing the decoded and inverse processed blocks of pels in a frame storage device at frame locations determined by the same pseudo-random order in which the blocks of pels were processed for transmission.

3. A method of coding blocks of pels of a video frame for transmission comprising the steps of:
    storing all of the pels in each of the blocks of the video frame;
    outputting the stored blocks of pels for the frame in a pseudo-random order;
    processing each block of pels in that pseudo-random order;
    storing the processed blocks of pels in a frame storage device at frame locations determined by the same pseudo-random order in which the blocks of pels were processed; and
    coding and transmitting the stored processed blocks of pels in sequential order.

4. Apparatus for coding blocks of pels of a video frame for transmission comprising:
    frame storage means for storing all of the pels in each of the blocks of the video frame;
    means for generating a pseudo-random sequence of numbers representing the locations of the blocks within the video frame;
    means for processing and coding each block of pels stored in said frame storage means, the blocks of pels in the video frame being processed and coded in the order of the pseudo-random sequence produced by said means for generating a pseudo-random sequence; and
    means for transmitting the processed and coded blocks of pels in that same pseudo-random order.

5. Apparatus in accordance with claim 4 wherein said means for processing and coding each block of pels comprises a hybrid differential pulse code modulation/discrete cosine transform source coder.

6. A system for coding and decoding blocks of pels of a video frame comprising:
    first frame storage means for storing all of the pels in each of the blocks of the video frame;
    means for generating a pseudo-random sequence of numbers representing the locations of the blocks within the video frame;
    means for processing and coding each block of pels stored in said first frame storage means, the blocks of pels in the video frame being processed and coded in the order of the pseudo-random sequence produced by said means for generating a pseudo-random sequence;
    means for transmitting the processed and coded blocks of pels in that same pseudo-random order;
    means for decoding and inversely processing the blocks of processed and coded blocks of pels sequentially received in said pseudo-random order; and
    second frame storage means for storing the decoded and inversely processed blocks of pels of the video frame at frame locations determined by the same pseudo-random order in which the blocks of pels were processed for transmission.

7. Apparatus for coding blocks of pels of a video frame for transmission comprising:
    first frame storage means for storing all of the pels in each of the blocks of the video frame;
    means for generating a pseudo-random sequence of numbers representing the locations of the blocks within the video frame;
    means for processing each block of pels in said first frame storage means, the blocks of pels in the video frame being processed in the order of the pseudo-random sequence produced by said means for generating a pseudo-random sequence;
    second frame storage means for storing the processed blocks of pels at frame locations determined by the same pseudo-random sequence produced by said means for generating a pseudo-random sequence; and
    means for coding and transmitting the blocks of processed pels stored in said second frame storage means in sequential order.

8. Apparatus in accordance with claim 7 wherein said means for processing each block of pels comprises a hybrid differential pulse code modulation/discrete cosine transform source coder.

* * * * *